United States Patent [19]

Thomas et al.

[11] 4,409,516
[45] Oct. 11, 1983

[54] ROUNDED END HALOGEN LAMP WITH EXHAUST TUBE HAVING DIFFERENT GLASS

[75] Inventors: George L. Thomas, Chesterland; William A. Graff, Willoughby, both of Ohio

[73] Assignee: General Electric Company, Schenectady, N.Y.

[21] Appl. No.: 227,224

[22] Filed: Jan. 22, 1981

[51] Int. Cl.³ .............................................. H01K 1/22
[52] U.S. Cl. .................................... 313/579; 313/634; 313/636; 313/315
[58] Field of Search ............... 313/222, 221, 315, 220, 313/636, 634, 578, 579

[56] References Cited

U.S. PATENT DOCUMENTS

| | | | |
|---|---|---|---|
| 3,798,491 | 3/1974 | Malm | 313/220 |
| 4,139,794 | 2/1979 | Malm et al. | 313/220 |
| 4,238,705 | 12/1980 | Thomas | 313/221 |
| 4,366,409 | 12/1982 | Nieda et al. | 313/221 |

Primary Examiner—Alfred E. Smith
Assistant Examiner—Sandra L. O'Shea
Attorney, Agent, or Firm—John F. McDevitt; Philip L. Schlamp; Fred Jacob

[57] ABSTRACT

An incandescent lamp of the tungsten halogen type is disclosed which includes the tipped-off residue of an exhaust tube formed with a high temperature aluminosilicate glass comprising in approximate weight percent 56–63 $SiO_2$, 13–17 $Al_2O_3$, 19–24 BaO, 1–4.5 CaO, and 0–3 $R_2O$ wherein R is an alkali metal ion, along with minor amounts of incidental impurities, residual fluxes and refining agents such that the aggregate BaO and CaO content lies within the approximate range 21–26 weight percent in order to eliminate need for the refractory metal spiral being contained within said exhaust tube in order to keep said exhaust tube open while the lamp lead-in wires are being hermetically sealed in the lamp envelope. The same glass composition can also be employed to form the entire lamp glass envelope along with the exhaust tube portion thereof with comparable results.

6 Claims, 2 Drawing Figures

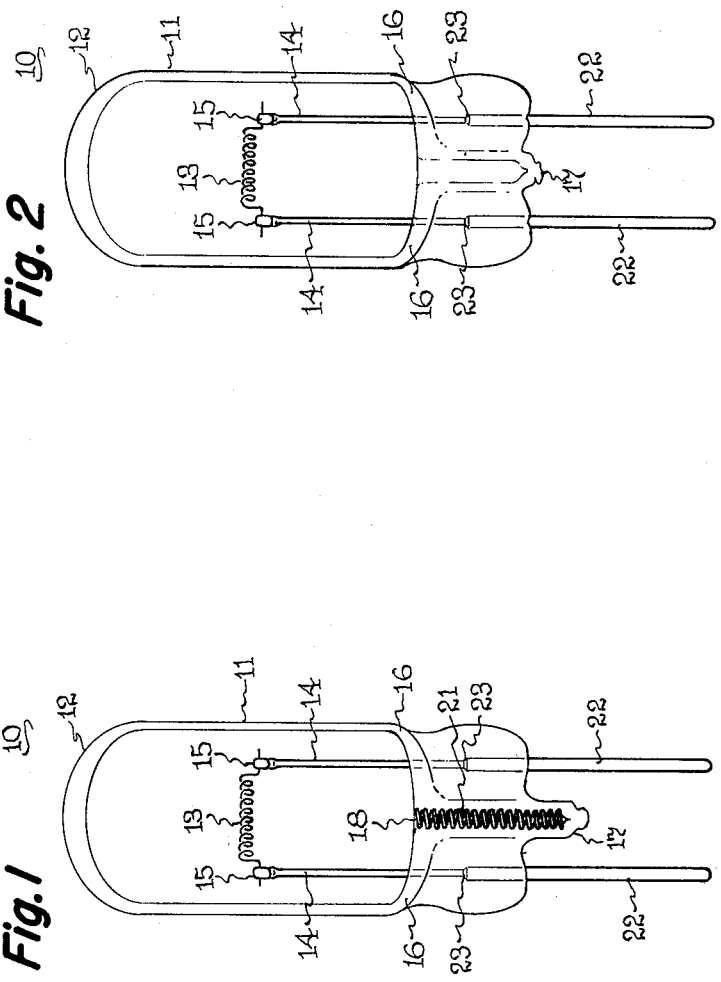

ROUNDED END HALOGEN LAMP WITH EXHAUST TUBE HAVING DIFFERENT GLASS

BACKGROUND OF THE INVENTION

The present invention relates generally to tungsten halogen incandescent lamps having a rounded end type envelope of a high temperature glass and a method of manufacture for said type lamps. More particularly, the present invention relates to improvements made in the high temperature aluminosilicate glass materials employed to form the lamp glass envelope and the exhaust tube portion thereof which have eliminated need to include a refractory metal spiral in said exhaust tube in order to keep the exhaust tube open while the lamp lead-in wires are being hermetically sealed in the lamp glass envelope and which further promotes less residual stress in the sealing region.

A detailed description of the method for manufacture of the above type incandescent lamps is found in issued U.S. Pat. No. 3,798,491, which is assigned to the assignee of the present invention. In said lamp manufacture, a preformed rounded end bulb of high temperature aluminosilicate glass is positioned over mount means which holds an exhaust tube with a refractory metal spiral such as tungsten, lightly embedded in the interior of the tube. Said mount also contains two refractory metal lead wires to which is attached the refractory metal incandescent filament. Heat is applied to the open end of the bulb thereby collapsing the bulb around the lead wires and the exterior portion of the exhaust tube containing the tungsten spiral. The lamp is then flushed with an inert gas to remove impurities and filled with a gas containing a halogen after which the exhaust tube is tipped off by reheating with flames of a gas burner which is generally employed as the heating source.

A number of problems are frequently encountered in this customary method of manufacture. The gas flame reheating employed to tip off the lamp assembly can puncture the exhaust tube leading to failure by entry of the ambient atmosphere into the lamp envelope. The refractory metal spiral employed to maintain the exhaust tube open when the lead-in wires are being hermetically sealed in said envelope by a press seal often extends below the press seal termination which can cause various difficulties during subsequent lamp manufacture and lamp assembly. The press seal formed with said refractory metal spiral is also subject to residual stress which can even produce lamp failure due to glass cracks or air leakage.

An improved high temperature aluminosilicate glass material for the above type incandescent lamps is disclosed in issued U.S. Pat. No. 4,238,705, which is also assigned to the present assignee. Said improved glass composition consists essentially of metal oxides as calculated from the starting batch of materials in the approximate percents by weight 54–71 $SiO_2$, 12–18 $Al_2O_3$, 10–23 BaO, 4–8 CaO, 0–3 $R_2O$, wherein R is an alkali metal ion, along with minor amounts of incidental impurities, residual fluxes and refining agents such that the aggregate $SiO_2$ and $Al_2O_3$ content lies within the approximate range 73–83 weight percent, the aggregate BaO and CaO content lies within the approximate range 17–30 weight percent, and the weight ratio between BaO and CaO lies within the approximate range 2.3 to 3.5 so as to provide improved reboil resistance. Said glass material further exhibits an average coefficient of linear thermal expansion 0°–300° C. temperature range between about $37$–$50 \times 10^{-7}/°$ C., a softening point in the 1,000°–1,140° C. range while retaining a comparatively low liquidus temperature not exceeding 1,350° C., and a sealing temperature which generally does not exceed about 1,450° C. Improved press seals are obtained with said glass material to include joinder of refractory metal lead-in wires, generally molybdenum, to larger diameter wires of an iron alloy having greater thermal expansion characteristics in the hermetic seal region of the lamp glass envelope.

It would be desirable to reduce the above-mentioned problems in both manufacture and use of this type incandescent lamp construction without requiring major modifications in the materials being used or lamp structure.

SUMMARY OF THE INVENTION

It is an important object of the present invention, therefore, to provide a still further improved high temperature aluminosilicate glass material which permits elimination of the refractory metal spiral component used in this lamp construction. It is a further object of the present invention to provide said improved aluminosilicate glass material which can be used to form the entire lamp glass envelope and exhaust tube components of the present lamp construction or simply for the exhaust tube component in combination with other prior art aluminosilicate glasses now customarily used to form the lamp glass envelope. A still further important object of the present invention is to provide a more stress-free seal construction for said type incandescent lamps and which is attributable in part to the physical properties of the improved glass material.

Briefly stated, the present glass compositions used in the improved lamp construction comprise in approximate weight percent 56–63 $SiO_2$, 13–17 $Al_2O_3$, 19–24 BaO, 1–4.5 CaO, and 0–3 $R_2O$, wherein R is an alkali metal ion, along with minor amounts of incidental impurities, residual fluxes and refining agents, such that the aggregate BaO and CaO content lies within the approximate range 21–26 weight percent. The improved incandescent lamp construction employing said glass material further includes a rounded end, refractory metal lead-in wires hermetically sealed into the lamp glass envelope at one end of said envelope opposite said rounded end, a tungsten filament connected at each end to said lead-in wires, said envelope containing the tipped off residue of an exhaust tube located at the end of the envelope opposite the rounded end and a filling within said envelope containing an inert gas and halogen wherein the improvement comprises not including a refractory metal spiral within said exhaust tube ordinarily used to keep said exhaust tube open while said lead-in wires are being hermetically sealed to the lamp glass envelope. The presently improved glass composition further exhibits an average coefficient of linear thermal expansion in the 0°–300° C. temperature range between about $42$–$47 \times 10^{-7}/°$ C., a softening point of at least about 1,050° C., a viscosity at the liquidus temperature of at least 100,000 poises, and a sealing point temperature of about 1,500° C. In a preferred lamp construction, the lead-in wires of molybdenum are hermetically sealed in the glass envelope by a pinch seal and said lead-in wires are joined to larger diameter lead-in wires generally of an iron alloy exhibiting greater thermal expansion than molybdenum in the hermetic seal region.

An especially preferred incandescent lamp construction of the present invention comprises an envelope of high temperature aluminosilicate glass comprising an approximate weight percent 54–71 $SiO_2$, 12–18 $Al_2O_3$, 4–8 CaO, 10–20 BaO, and 0–3 $R_2O$, wherein R is an alkali metal ion, along with minor amounts of incidental impurities, residual fluxes and refining agents, such that the aggregate $SiO_2$ and $Al_2O_3$ content lies within the approximate range 73–83 weight percent, the aggregate BaO and CaO content lies within the approximate range 17–30 weight percent and the ratio between BaO weight percent and CaO weight percent lies within the approximate range 2.3 to 2.5, said envelope also having a rounded end, refractory metal lead-in wires hermetically sealed into said envelope at one end of said envelope opposite said rounded end, a tungsten filament connected at each end to said lead-in wires, said envelope containing the tipped off residue of an exhaust tube prepared from a different high temperature aluminosilicate glass located at the end of the envelope opposite the rounded end, with said different high temperature aluminosilicate glass comprising in approximate weight percent 56–63 $SiO_2$, 13–17 $Al_2O_3$, 19–24 BaO, 1–4.5 CaO, and 0–3 $R_2O$, wherein R is an alkali metal ion, along with minor amounts of incidental impurities, residual fluxes and refining agents, such that the aggregate BaO and CaO content lies within the approximate range 21–26 weight percent, and a filling within said envelope containing an inert gas and halogen, wherein the improvement comprises omitting a refractory metal spiral within said exhaust tube in order to keep said exhaust tube open while said lead-in wires are being hermetically sealed in said envelope.

DESCRIPTION OF THE DRAWINGS

FIG. 1 depicts in perspective a prior art incandescent lamp construction including the refractory metal spiral within the exhaust tube component; and FIG. 2 depicts in perspective the improved seal construction for an incandescent lamp made in accordance with the present invention.

DESCRIPTION OF THE PREFERRED EMBODIMENTS

Referring to FIG. 1, there is shown in perspective lamp 10 comprising a glass envelope 11 having a rounded end 12 and a pinched end. Inside the envelope, filament 13 is connected to lead wires 14 by hooks or clamps 15. Lead-in wires 14 preferably comprise a refractory metal such as molybdenum or tungsten. As described in the aforementioned U.S. Pat. No. 3,798,491, the lead-in wires are sealed to the hard or high temperature glass envelope 11 at a pinch seal region 16. The lamp is flushed and filled with a halide gas mixture by way of exhaust tube 18 which is maintained open while the press seal is being formed by a coil of tungsten or other refractory metal 21. The lead-in wires 14 are connected at their exteriormost ends by conventional means such as brazing or welding to relatively larger diameter lead-in wires 22 such as illustrated by welds 23.

An improved lamp construction according to the present invention is depicted in FIG. 2. Accordingly, the glass envelope 11 of said lamp 10 having a rounded end 12 can be formed with the glass material disclosed in the aforementioned U.S. Pat. No. 4,238,705. Inside said envelope, filament 13 is again connected to lead wires 14 by hook or clamp elements 15. The lead-in wires 14 in said lamp embodiment preferably comprise molybdenum which are hermetically sealed in the seal region to produce a direct glass tube metal seal by an otherwise conventional pinching step employed during the lamp manufacture. As distinct from the lamp embodiment depicted in FIG. 1, however, the exhaust tube component of the improved lamp construction utilizes a glass composition having in weight percent 60.05 $SiO_2$, 14.25 $Al_2O_3$, 23.60 BaO and 2.1 CaO plus incidental pick-up from furnace refractories and refining agents added to a melting. Said glass material exhibits an average coefficient of linear thermal expansion in the 0°–300° C. temperature range of approximately $43.6 \times 10^{-7}/°$ C., a softening point of 1,070° C., a sealing point temperature of 1,550° C., and a viscosity at the liquidus temperature of at least 100,000 poises. A second distinction from the previous lamp embodiment occurs at the tip-off portion 17 of said exhaust tube 18 which desirably does not extend beyond the termination of the pinch seal 16 along with elimination of the tungsten spiral element 21 previously employed in said FIG. 1 lamp embodiment. Lead-in wires 14 have again been hermetically sealed at the pinch seal region to iron alloy in-leads of larger diameter 22 at the weld junctions 23.

Illustrative improved glass compositions of the present invention are shown in Table 1 below. The present glass compositions exhibit a viscosity of approximately $10^{3.5}$ poises at the sealing temperature region of at least 1,500° C. or higher which is approximately 50° greater than the sealing point temperatures exhibited by the glass materials disclosed in the aforementioned U.S. Pat. No. 4,238,705. Since the improved glass material should be capable of being formed into tubing for use in the improved lamp construction, the liquidus temperature for said new glass material also must not exceed about 1,350° C. in order to prevent devitrification of the glass when being drawn into tubing. The present glass material may also include a small amount of alkali metal oxide if use is limited to the exhaust tube component of the lamp which can be maintained remote from the halogen atmosphere inside the lamp glass envelope.

TABLE 1

| Weight Percent | 1 | 2 | 3 | 4 | 5 | 6 |
|---|---|---|---|---|---|---|
| $SiO_2$ | 60.1 | 62.0 | 60.1 | 58.8 | 61.3 | 60.0 |
| $Al_2O_3$ | 14.2 | 13.5 | 15.4 | 15.5 | 16.5 | 16.1 |
| BaO | 23.6 | 22.5 | 21.1 | 23.6 | 18.8 | 19.8 |
| CaO | 2.1 | 2.0 | 3.4 | 2.1 | 2.0 | 4.1 |
| $K_2O$ | — | — | — | — | 1.4 | — |
| Softening Point °C. | 1070 | 1078 | 1060 | 1079 | 1107 | 1069 |
| Annealing Point °C. | 819 | — | 819 | 823 | — | 814 |
| Strain Point °C. | 761 | — | 766 | 765 | — | 757 |
| Coefficient of Expansion (0–300° C.) × $10^7$/°C. | 43.6 | 42.0 | 43.1 | 43.5 | 43.6 | 42.8 |
| Liquidus Temp. °C. | 1290 | 1300 | 1304 | 1340 | 1320 | 1297 |
| Sealing Point °C. | 1550 | 1580 | 1530 | 1550 | 1570 | 1530 |

As can be noted from the above Table, the glass composition in example 5 includes a modest amount of an alkali metal oxide while still maintaining all of the metal oxide constituents within the critical proportions required to provide the desired improvements.

It will be apparent from the foregoing description that a novel incandescent lamp construction has been provided affording significant advantages in manufacture and subsequent use. It will be apparent that minor variations in the disclosed glass compositions other than above specifically disclosed are contemplated for use such as by addition of $La_2O_3$ which can produce a slight decrease in both viscosity and liquidus temperature. It is intended to limit the present invention, therefore, only by the scope of the following claims.

What we claim as new and desire to secure by United States Letters Patent is:

1. An improved incandescent lamp comprising an envelope of a first high temperature aluminosilicate glass exhibiting a sealing temperature not exceeding about 1450° C. comprising in approximate weight percent 54–71 $SiO_2$, 12–18 $Al_2O_3$, 4–8 CaO, 10–23 BaO, and 0–3 $R_2O$, wherein R is an alkali metal ion, along with minor amounts of incidental impurities, residual fluxes and refining agents, such that the aggregate $SiO_2$ and $Al_2O_3$ content lies within the approximate range 73–83 weight percent, the aggregate BaO and CaO content lies within the approximate range 17–30 weight percent and the ratio between BaO weight percent and CaO weight percent lies within the approximate range 2.3 to 3.5, said envelope also having a rounded end, refractory metal lead-in wires hermetically sealed into said envelope at one end of said envelope opposite said rounded end, a tungsten filament connected at each end to said lead-in wires, said envelope containing the tipped-off residue of an exhaust tube prepared from a second different higher temperature aluminosilicate glass located at the end of the envelope opposite the rounded end and exhibiting a higher sealing temperature of about 1500° C., with said different higher temperature aluminosilicate glass comprising in approximate weight percent 56–63 $SiO_2$, 13–17 $Al_2O_3$, 19–24 BaO, 1–4.5 CaO, and 0–3 $R_2O$, wherein R is an alkali metal ion, along with minor amounts of incidental impurities, residual fluxes and fining agents, such that the aggregate BaO and CaO content lies within the approximate range 21–26 weight percent and the ratio between BaO weight percent and CaO weight percent exceeds 4.7, and a filling within said envelope containing an inert gas and a halogen, wherein the improvement comprises having said exhaust tube devoid of any conventional refractory metal spiral.

2. An improved lamp as in claim 1 wherein the glass composition of the exhaust tube has an average coefficient of linear thermal expansion in the 0°–300° C. temperature range between about $42 \times 10^{-7}/°$ C. to about $47 \times 10^{-7}/°$ C., a softening point of at least about 1,050° C., a viscosity at the liquidus temperature of at least 100,000 poises, and a sealing point temperature of at least about 1,500° C.

3. An improved lamp as in claim 1 wherein the lead-in wires are hermetically sealed in the glass envelope by a pinch seal.

4. An improved lamp as in claim 1 wherein the lead-in wires are molybdenum.

5. An improved lamp as in claim 1 wherein said lead-in wires are joined to larger diameter lead-in wires having greater thermal expansion characteristics in the hermetic seal region.

6. An improved lamp as in claim 5 wherein the larger diameter lead-in wires are an iron alloy.

* * * * *